United States Patent
Van Der et al.

(10) Patent No.: US 7,209,413 B2
(45) Date of Patent: Apr. 24, 2007

(54) OPTICAL SCANNING DEVICE

(75) Inventors: Michael Adrianus Henricus Van Der, Eindhoven (NL); Gerardus Lucien Mathildus Jansen, Eindhoven (NL); Gerard Johannes Pieter Nijsse, Eindhoven (NL); Johannes Joseph Hubertina Barbara Schleipen, Eindhoven (NL); Aukje Arianne Annette Kastelijn, Eindhoven (NL); Frank Cornelis Penning, Eindhoven (NL); Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 271 days.

(21) Appl. No.: 10/521,658

(22) PCT Filed: Jul. 2, 2003

(86) PCT No.: PCT/IB03/02974

§ 371 (c)(1),
(2), (4) Date: Jan. 18, 2005

(87) PCT Pub. No.: WO2004/010201

PCT Pub. Date: Jan. 29, 2004

(65) Prior Publication Data

US 2005/0201218 A1 Sep. 15, 2005

(30) Foreign Application Priority Data

Jul. 23, 2002 (EP) .................................. 02078050
Apr. 2, 2003 (EP) .................................. 03100876

(51) Int. Cl.
*G11B 7/00* (2006.01)

(52) U.S. Cl. .............................. 369/44.18; 369/112.01; 369/112.27

(58) Field of Classification Search ..................... None
See application file for complete search history.

(56) References Cited

U.S. PATENT DOCUMENTS

2002/0024919 A1* 2/2002 Lee et al. ............... 369/112.24
2003/0035361 A1* 2/2003 Knight et al. .......... 369/112.24

* cited by examiner

*Primary Examiner*—Muhammad Edun
(74) *Attorney, Agent, or Firm*—Michael E. Belk (57) ABSTRACT

An optical scanning device for scanning an information layer of an optical record carrier and including a rotary aim (2; 102; 202; 302; 402; 502) which is arranged to swing about a rotation axis (CR) to alter an angular position of the rotary arm about the rotation axis; a detector arrangement (10) arranged separate from the rotary arm (2; 102; 202; 302; 402; 502) for detecting a radiation beam spot, the radiation beam spot (40; 140; 240; 340; 440; 540) having an angular disposition; a first reflective surface (4; 104; 204; 304; 404; 504) attached to the rotary arm (2; 102; 202; 302; 402; 502); a second reflective surface (6; 106; 206; 306; 406; 506) attached to the rotary arm (2; 102; 302; 402; 502); a first light path (LP 1; LP 1 O 1; LP201; LP301; LP401; LP501; running from a location on the record carrier to said first reflective surface; a second light path (LP2; LP102; LP202; LP302; LP402; LP502) running from said first reflective surface to said second reflective surface; a third light path (LP3; LP103; LP203; LP303; LP403; LP503) running from said second reflective surface to said detector arrangement (10). The rotary arm includes at least one optical inversion element (52; 54; 56; 58; 64; 66) arranged such that a dependence between variation of the angular disposition of the radiation beam spot and variation of the angular position of the rotary arm is reduced.

11 Claims, 7 Drawing Sheets

OPTICAL SCANNING DEVICE

This invention relates to an optical scanning device, particularly to an optical scanning device comprising a rotary arm for scanning an optical record carrier.

The rotary arm system is known for electromechanical adjustment of a read/write head. A rotary arm scanning mechanism is widely used in magnetic disc recording/reproducing apparatus, commonly known as hard disc drives, for scanning magnetic discs. The use of a rotary arm has also been considered for optical disc recording/reproducing apparatus, for scanning optical or magneto-optical discs. A rotary arm provides a simpler mechanism with a reduced number of parts compared to a 2-stage sledge mechanism, which is the most commonly used scanning mechanism in optical disc systems.

In known optical scanning devices in which a rotary arm scanning mechanism is used, the optical components, including the laser and detector system, are located on the moving rotary arm. In such a system all the control and information signals for the laser and the detector system have to be transferred over a connection foil to and from the rotary arm system. In the case of a Small Form Factor Optical (SFFO) device, due to the high speeds and the required noise immunity, even the electronics for driving the laser and processing the detector signals may need to be located on the moving arm. This would result in a thermal problem with heat dissipation of the laser and its associated electronics (driver), a dynamical problem due to the relatively heavy weight of the optical and electrical components, and an interconnection problem due to the large amount of electrical connections to the laser circuitry and the detection circuitry.

These problems can be overcome by using a split optics system. This involves positioning the laser, the detector array, the electronics and most of the optics of the optical scanning device at a fixed location separated from the rotary arm. In operation of such a system, a radiation beam is reflected by the optical record carrier and directed back along the rotary arm and on to the detector array. Due to a variation of an angular position of the rotary arm about a rotation axis an associated rotation of a radiation beam spot on the detector array occurs. As a result of this rotation an angular disposition of the radiation beam spot falling on the detector array is not consistent. This causes problems for interpretation by the detector array of a data signal being carried by the radiation beam.

JP 2001-357549 describes an optical scanning device with a rotary arm in which the polarization of a radiation beam, having been reflected by an optical record carrier, is rotated by a rotatable prism which is separate from the rotary arm. This ensures that an orientation of the radiation beam falling on a detector array is consistent. In order to rotate the prism a rotation mechanism is necessary which occupies additional space in the optical scanning device and adds complexity to its construction.

In accordance with the present invention there is provided an optical scanning device for scanning an information layer of an optical record carrier, the device including:

a rotary arm which is arranged to swing about a rotation axis to alter an angular position of the rotary arm about the rotation axis;

a detector arrangement arranged separate from the rotary arm for detecting a radiation beam spot, the radiation beam spot having an angular disposition;

a first reflective surface attached to the rotary arm;

a second reflective surface attached to the rotary arm;

a first light path running from a location on the record carrier to said first reflective surface;

a second light path running from said first reflective surface to said second reflective surface;

a third light path running from said second reflective surface to said detector arrangement, characterized in that said rotary arm includes at least one optical inversion element arranged such that a dependence between variation of the angular position of the rotary arm and variation of the angular disposition of the radiation beam spot is reduced.

The optical inversion element of the rotary arm reduces variation of the angular disposition of the radiation beam spot with a change in the angular position of the rotary arm. By reducing the dependency, techniques such as astigmatic focus error detection may be employed.

Preferably the angular disposition of the radiation beam spot falling on the detector array is substantially independent of the angular position of the rotary arm, other than a variation caused by a change in the direction of data tracks on the optical record carrier across the swing path of the rotary arm.

It is noted that German patent application DE 198 60054 describes an optical scanning device for scanning an optical record carrier with a rotary arm. This rotary arm has different angular positions about a rotation axis and additionally has a first and a second mirror attached to it. The first mirror receives a radiation beam reflected in a downwards direction from an optical record carrier. This radiation beam is directed along the rotary arm by the first mirror to the second mirror which reflects the radiation beam, also in a downwards direction, towards a third mirror. In this arrangement an angular disposition of a cross section of the radiation beam reflected by the second mirror is substantially independent of the angular position of the rotary arm. However, a build-height in the axial direction of this arrangement is relatively bulky. It is a further advantage of embodiments of the present invention to reduce this build-height such that a more compact optical scanning device may be constructed.

Further features and advantages of the invention will become apparent from the following description of preferred embodiments of the invention, given by way of example only and with reference to the accompanying drawings.

Figure 1:
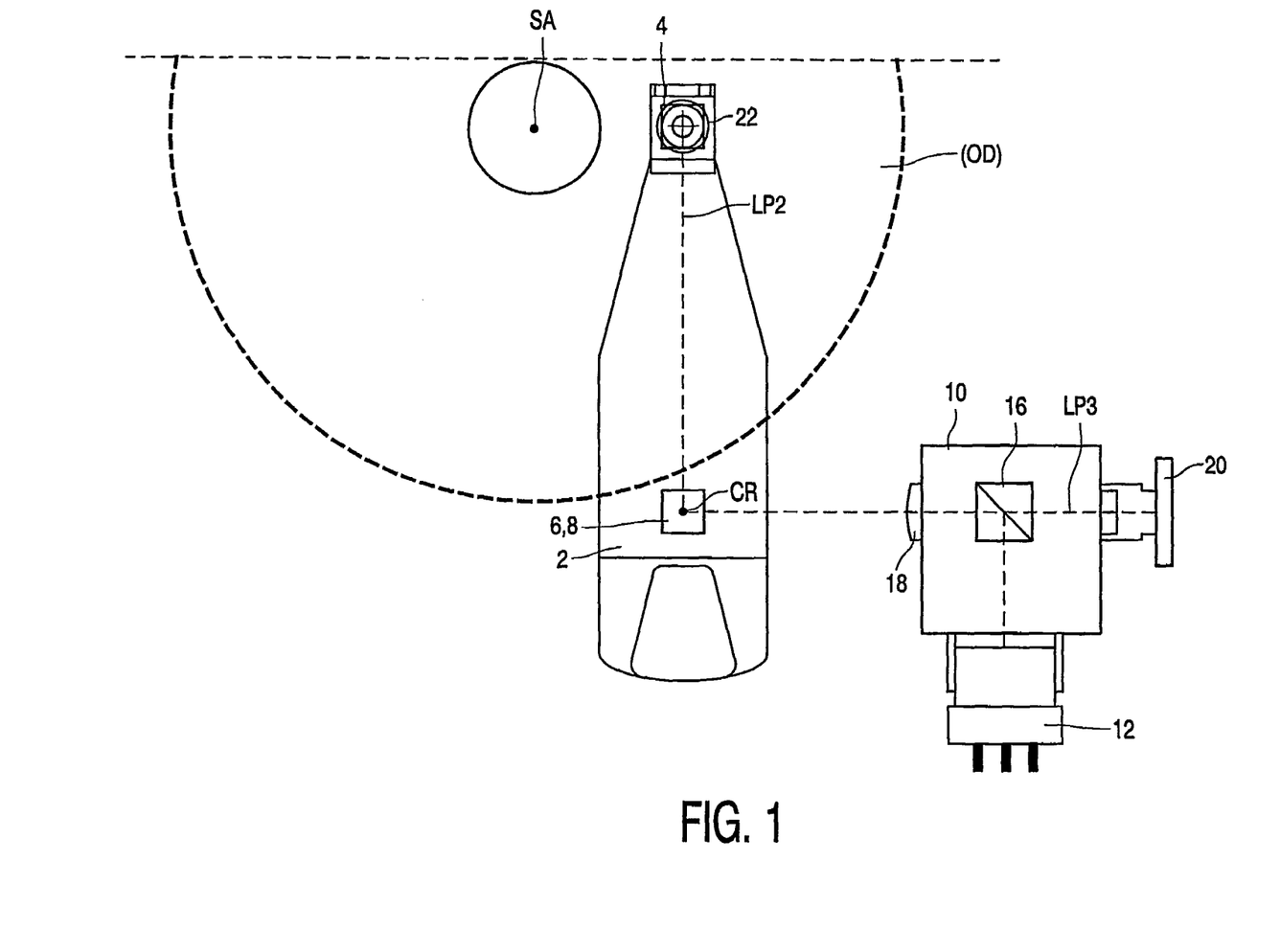
FIG. 1 shows a plan view of components of an optical scanning device of a type similar to an embodiment of the present invention.
Figure 2:
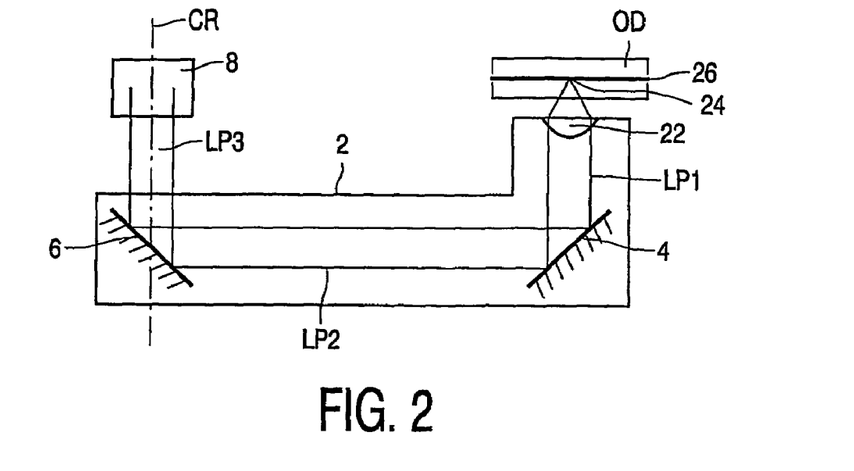
FIG. 2 shows a side cross section illustrating components of an optical scanning device of the type similar to an embodiment of the present invention.

FIG. 1 shows a plan view and FIG. 2 shows a side cross section of components of an optical scanning device of a type similar to embodiments of the present invention, but not arranged in accordance with the invention. The optical scanning device includes a rotary arm 2 which is arranged to swing about a rotation axis CR such that an angular position of the rotary arm 2 can be varied. The rotary arm 2 has a bearing system, which consists of two ball elements. One ball element is located on one part of the rotary arm; the other ball is located on another part. The ball elements are allowed to rotate in a slightly oversized bearing shale. The actuation system for the rotary arm 2 includes a coil at one end of the arm located in a magnetic field, such that one side of the coil is in a vertical upwards field and the other side of the coil is in a vertical downwards field. A current through the coil will generate Lorenz forces, which rotate the arm in the desired direction.

At one end of the rotary arm 2 is attached a first reflective surface, in the form of a first folding mirror 4. A second reflective surface and a third reflective surface, in the form of a second and a third folding mirror 6, 8 respectively, are stacked along the rotation axis CR. The second folding mirror 6 is attached to the rotary arm 2 and therefore rotates about the rotation axis CR with a rotation of the rotary arm. The third folding mirror 8 is part of a fixed detector arrangement also including a laser/detector unit 10 which is separate from the rotary arm 2. The laser/detector unit 10 includes a radiation source 12, for example a semiconductor laser, a beam splitter 16, a collimator lens 18 and a detector array 20. The radiation source 12 emits a radiation beam which is directed by the beam splitter 16 to the collimator lens 18 which collimates the radiation beam. This now collimated radiation beam travels to the third folding mirror 8 which directs the radiation beam along the rotation axis CR to the second folding mirror 6. The radiation beam travels from here to the first folding mirror 4 which directs the radiation beam to an objective lens 22 attached to the rotary arm 2. The objective lens 22 focuses the radiation beam to a spot 24 at a radial location on an information layer 26 of an optical record carrier. In this example the optical record carrier is an optical disc OD, for example a CD, a DVD or a Small Form Factor Optical (SFFO) disc. The optical disc OD rotates about a spindle axis SA in order that the spot 24 can scan along a track of the information layer 26. In FIG. 1 the optical disc OD, although not shown directly, is indicated in outline in position to the above components of the optical scanning device. The objective lens 22 and the first folding mirror 4 are mounted on a holder element (not shown) which is suspended on two parallel flexures. A drive coil located on the holder element can generate vertical forces such that variation of the focus of the radiation beam to the spot 24 can be achieved.

The radiation beam, having been focused to the spot 24 is reflected by the information layer 26 and travels along a linear first light path LP1 to the first folding mirror 4. The first light path LP1 is parallel to the rotation axis CR. The radiation beam travels from the first folding mirror 4 to the second folding mirror 6 along a linear second light path LP2 which is perpendicular the rotation axis CR. The second folding mirror 6 directs the radiation beam along a third light path LP3 running from the second folding mirror 6 to the detector array 20 of the detector arrangement 10. A portion of the third light path LP3 between the second and third folding mirrors 6, 8 is linear and coincident with the rotation axis CR. From the third folding mirror 8 the radiation beam continues to travel along the third light path LP3 via the collimator lens 18, then the beam splitter 16 to the detector array 20. The detector array 20 includes detector elements which produce a main information signal relating to data stored on the information layer 26 of the optical disc OD, a focus error signal and a tracking error signal.

Figure 3:
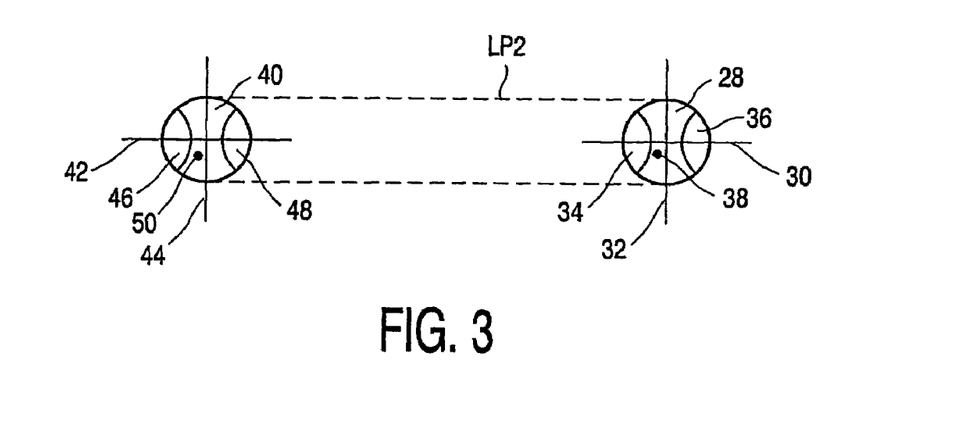
FIGS. 3 and 4 show schematically cross sections of a radiation beam for different angular positions of a rotary arm of an optical scanning device of the type similar to an embodiment of the present invention.
Figure 4:
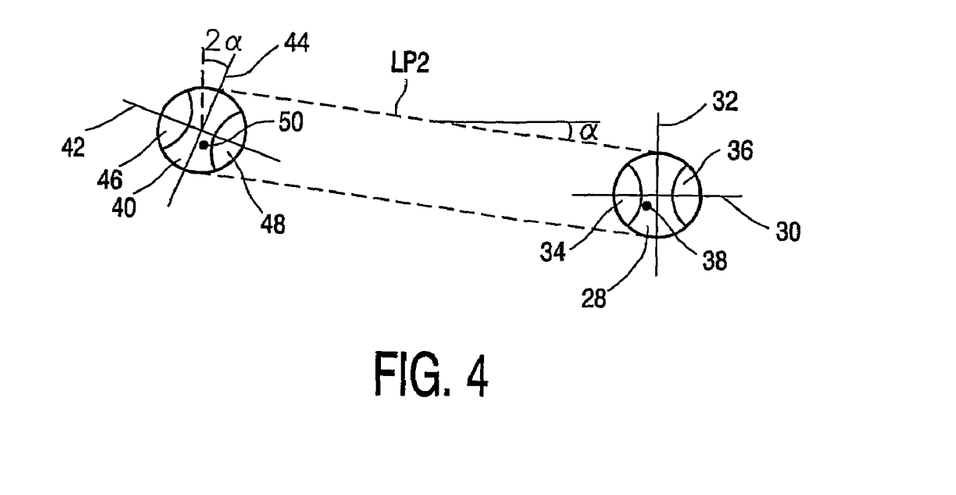

Referring now also to FIGS. 3 and 4, cross sections of a radiation beam for different angular positions of the rotary arm 2 of the optical scanning device shown by FIGS. 1 and 2, are shown schematically. FIG. 3 corresponds to the rotary arm 2 being in a first angular position about the rotation axis CR and FIG. 4 corresponds to the rotary arm 2 being in a second angular position about the rotation axis CR. The second angular position is displaced about the rotation axis CR from the first angular position by an angle □. The radiation beam travelling from the spot 24 to the first folding mirror 4 along the first light path LP1 has a first cross section 28. For illustrative purposes the first cross section 28 has a first reference axis 30 and a second reference axis 32 are in the plane of the first cross section 28 and illustrate an angular disposition of the first cross section 28, the second reference axis 32 being perpendicular to the first reference axis 30. The first light path LP1 is perpendicular to both the first and the second reference axes 30, 32 respectively. The first cross section 28 has a first and a second region 34, 36 corresponding to the overlap of the −1 and +1 diffraction order beams of the radiation beam as diffracted by the tracks of the optical disc OD, with the first zeroth order main beam. These regions 34, 36 may be used by the detector array 20 to perform a radial tracking function, for example one spot push-pull radial tracking, when scanning the information layer 26 of the optical disc OD. For further illustrative purposes the first cross section 28 is shown with an off-center reference point 38.

The radiation beam travelling along the third light path LP3 has a second cross section 40 which corresponds in angular disposition directly with that of the radiation beam spot falling on the detector array 20. For similar illustrative purposes the second cross section 40 has a first reference axis 42 and a second reference axis 44 which are in the plane of the second cross section 40 and illustrate an angular disposition of the second cross section 40, and which correspond to the previously-described axes 30, 32 in the first cross section 28. The third light path LP3 is perpendicular to both the first and the second reference axes 42, 44 respectively. The second cross section 40 has a first and a second region 46,48 corresponding to the regions 34, 36 in the first previously described cross section 28. As described these regions 46, 48 may be used by the detector array 20 to perform a radial tracking function. For further illustrative purposes the second cross section 40 has an off-center reference point 50 corresponding to the previously-described reference point 38 in the first cross section 28.

With the rotary arm 2 in either the first angular position or the second angular position, the first cross section 28 has the same angular disposition. However, with the rotary arm 2 in the second angular position, as shown in FIG. 4, the second cross section 40 has a different angular disposition to the second cross section 40 when the rotary arm 2 is in the first angular disposition, as shown in FIG. 3. The angular disposition of the second cross section 40 with the rotary arm in the first angular position is related to the second cross section 40 with the rotary arm in the second angular position by the angle 2α. Additionally, with the rotary arm 2 in the second angular position the second cross section 40 is an inverted version of the first cross section 28 about the second reference axis 32. The different positions of the off-center reference points 38, 50 of the first and second cross sections respectively illustrate this.

This dependence of the angular disposition of the second cross section 40 on the angular position of the rotary arm 2 creates a problem for the positioning of the detector arrangement 10 of the optical scanning device as the angular disposition radiation beam spot falling on the detector array 20 is not constant, as in known optical scanning devices which use a linear tracking system.

Figure 5:
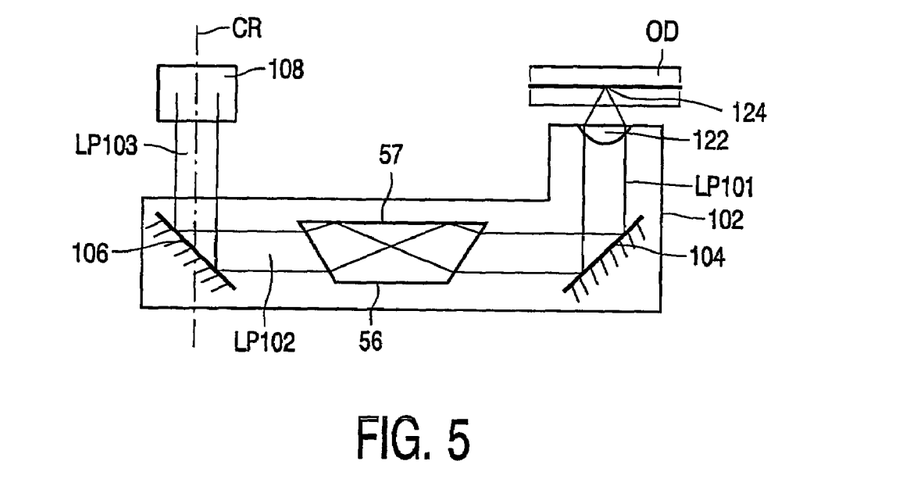
FIG. 5 shows a side cross section of components of an optical scanning device in accordance with an embodiment of the present invention.

FIG. 5 shows a side cross section of components of an optical scanning device in accordance with an embodiment of the present invention.

Figure 6:
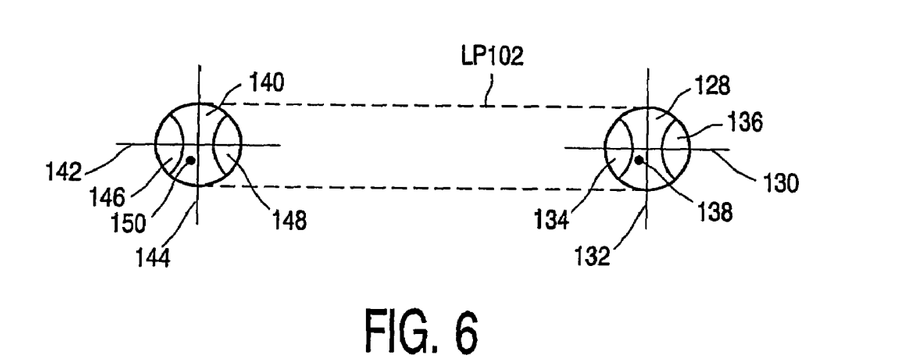
FIGS. 6 and 7 show schematically cross sections of a radiation beam for different angular positions of a rotary arm in accordance with an embodiment of the present invention.
Figure 7:
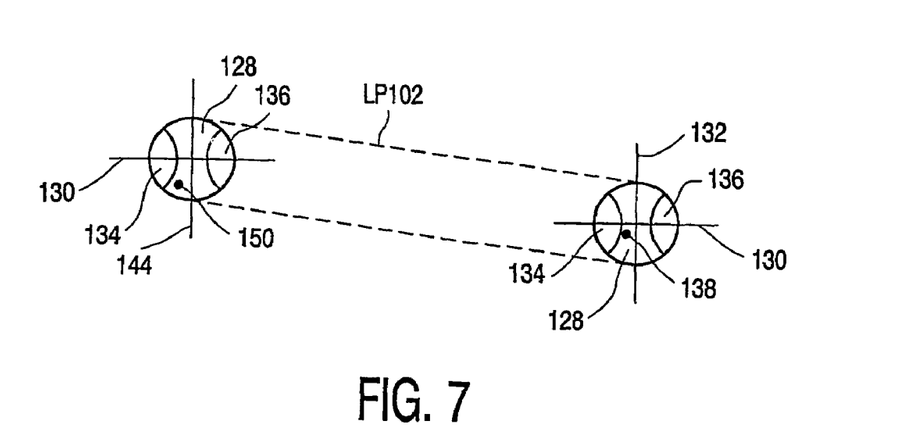

FIGS. 6 and 7 show schematically cross sections of a radiation beam for different angular positions of a rotary arm in accordance with this embodiment of the present invention. The radial arm 102 is shown schematically using dotted lines.

Features of this embodiment are similar to those of the optical scanning device previously described. Such features are labeled with similar reference numerals incremented by 100 and the descriptions should be taken to apply here also.

In this embodiment of the present invention, an optical inversion element, which is rigidly fixed to the rotary arm 102, includes a single reflective surface 57. The optical inversion element comprises a prism, specifically a Dove prism 56. The rotation axis CR is arranged vertically and the single reflective surface 57 of the Dove prism 56 is arranged horizontally. The radiation beam travelling along the second light path LP 102 from the first folding mirror 104 is reflected by the single reflective surface 57 of the Dove prism 56 before travelling to the second folding mirror 106.

Referring now to FIG. 6, with the rotary arm 102 in the first angular position, the first cross section 128 has the same angular disposition as the second cross section 140. Referring now to FIG. 7, with the rotary arm 102 in the second angular position, the first cross section 128 and the second cross section 140 now also both have the same angular disposition. Additionally the second cross section 140 relative to the first cross section 128 is not an inverted version of the first cross section 128 about the second reference axis 132, as illustrated by the positions of the respective off-center reference points 138, 150 of the first and second cross sections 128, 140.

The angular disposition of the second cross section 140 and the angular position of the rotary arm 102 are now substantially independent of each other such that the radiation beam spot falling on the detector array 120 is relatively constant.

The angular disposition of the second cross section 140 and the angular position of the rotary arm 102 are not entirely independent of each other due to a slight variation of an angular disposition of the first cross section 128 with respect to the information layer 126 of the optical disc OD. This results in a variation of the angular disposition of the radiation beam spot falling on the detector array 120. The information layer 126 comprises tracks which are parallel each other along a radius R from the spindle axis SA of the optical disc OD. In order for the first cross section 128 to have a constant angular disposition, the spot 124 would need to scan along the radius of the optical disc OD from the spindle axis SA. However, when the rotary arm 102 is swung about the rotation axis to achieve different angular positions, the scanning of the spot 124 across the tracks of the optical disc OD describes an arc. Therefore the first cross section 128 of the radiation beam has a slight variation in its angular disposition dependent on the angular position of the rotary arm 102.

In the case where the optical scanning device of this embodiment is a Small Form Factor Optical (SFFO) scanning device, the optical disc OD has a radius from the spindle axis SA of between 10 mm and 20 mm, more preferably approximately 15 mm. Furthermore in this case and in order to minimize the dependency of the angular disposition of the first cross section 128 on the angular position of the rotary arm 102, it is preferable that the rotary arm 102 has a length of between 10 mm and 20 mm, more preferably approximately 15 mm between the rotation axis CR and the spot 124. The optical disc OD is preferably arranged such that an inner track $R_{in}$ lies at a radius of between 4 mm and 10 mm, more preferably approximately 6 mm from the spindle axis SA and that an outer track $R_{out}$ lies at a radius of between 10 mm and 18 mm, more preferably approximately 14 mm from the spindle axis SA of the optical disc OD. Preferably when the angular position of the rotary arm 102 has α=0° the spot 124 lies at a radius of approximately central to the inner and outer radii, in the most preferred arrangement approximately 10 mm of the optical disc OD. In the most preferred arrangement, the rotary arm 102 needs to swing by an angle (α) of approximately −11.5° or +11.5° to scan the inner or outer track accordingly. When the rotary arm 102 is in the position to scan the inner track $R_{in}$ or the outer track $R_{out}$, where α=−11.5° or α=+11.5° accordingly, then an angular disposition of the first cross section of the radiation beam 128 is approximately 0°. When the rotary arm 102 is in a position to scan the track approximately central to the inner and outer radii $R_{in}$, $R_{out}$ of the optical disc OD, α=0°. In this position where α=0° the first cross section of the radiation beam 128 has an angular disposition of approximately 3.2°. Consequently a variation of the angular disposition of the radiation beam spot falling on the detector array 120 of between approximately 0° and 3.2° occurs depending on the angular position of the rotary arm 102. Preferably the detector array 120 is arranged such that the angular disposition of the radiation beam spot falling on the detector array 120 varies such that 0° falls approximately in the center of the range (for example between −1.6° and +1.6°) as this provides an electrical advantage compared with a variation between for example 0° and 3.2°.

In this arrangement any variation of the angular disposition of the first cross section 128 with the angular position of the rotary arm 102 and therefore of the radiation beam spot falling on the detector array 20 is kept to a minimum.

Minimum and maximum values of the angle of rotation a of the rotary arm 102 can be described more generally for an optical disc OD with a radius R from the spindle axis SA by the following:

$$\text{Minimum } \alpha = -\arcsin\left(\frac{x}{L}\right) \quad (1)$$

$$\text{Maximum } \alpha = +\arcsin\left(\frac{x}{L}\right) \quad (2)$$

wherein L is a length of the rotary arm 102 between the rotation axis CR and the spot 124. The rotary arm 102 is preferably arranged such that approximately α=0° when a track lying approximately central to the inner and outer radii $R_{in}$, $R_{out}$ is being scanned. During scanning of this track, the spot 124 is focused at a position lying along the arc described by the swinging of the rotary arm 102 about the rotation axis CR, not along the radius R; and wherein $x=0.5\times(R_{out}-R_{in})$ A distance D between the rotation axis CR and the radius R of the optical disc OD lies perpendicular the radius R and substantially parallel the length L when □=0°. This distance D can be calculated as follows:

$$D=\sqrt{L^2-x^2}. \quad (3)$$

Figure 8:
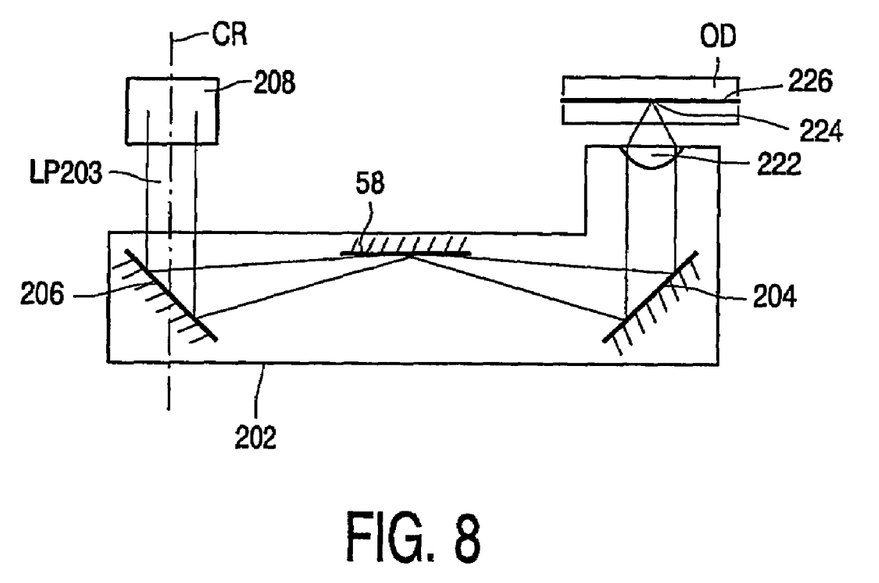
FIG. 8 shows a side cross section of components of an optical scanning device in accordance with an alternative embodiment of the present invention.

FIG. 8 shows a side cross section of components of an optical scanning device in accordance with an alternative embodiment of the present invention. This embodiment allows a reduced rotary arm mass to be achieved.

Features of this embodiment are similar to those of the optical scanning device previously described. Such features are labeled with similar reference numerals incremented by 200 and the descriptions should be taken to apply here also.

As for the previous embodiment an optical inversion element, which is rigidly fixed to the rotary arm 202, comprises a single reflective surface which is a mirror 58. The rotation axis CR is arranged vertically and the mirror 58 is arranged horizontally. In this embodiment the mirror 58 is attached to an upper surface of the rotary arm 202. The radiation beam travelling along the second light path LP202 from the first folding mirror 204 is reflected by the mirror 58 to the second folding mirror 206.

As for the previous embodiment and illustrated using FIGS. 6 and 7, the angular disposition of the second cross section 240 and the angular position of the rotary arm 202 are substantially independent of each other such that the radiation beam spot falling on the detector array 220 is relatively constant. As described earlier there is also a slight variation of an angular disposition of the first cross section 228 with respect to the information layer 226 of the optical disc OD.

In order for the radiation beam travelling along the second light path LP202 to be reflected by the mirror 58, the first and second folding mirrors, 204, 206 respectively need to have a specific tilt angle β. The rotary arm 202 has a length $L_{202}$ from the rotation axis CR to the first light path LP201. This length $L_{202}$ lies perpendicular the rotation axis CR. The rotary arm 202 also has a height H from the mirror 58 to a point at which the radiation beam travelling along the second light path LP202 strikes the first or the second folding mirror 204, 206. This height H is parallel the rotation axis CR. The mirror 58 has a length $L_{58}$ lying perpendicular the rotation axis CR which is greater than or equal to the minimum length required for reflection of the radiation beam. The radiation beam travelling along the second light path LP202 has a diameter d. From this information, the tilt angle β can be calculated, the tilt angle β being the angle of the first or second folding mirror 204, 206 with respect to a line perpendicular the rotation axis CR. The calculation is as follows:

$$\beta = \frac{1}{2} \cdot \arctan\left(\frac{L_{202}}{2H}\right) \quad (4)$$

From this the value of the length $L_{58}$ of the mirror 58 can be calculated:

$$L_{58} \geq \frac{d}{\sin(90-2\beta)} \quad (5)$$

For example, if $L_{202}$=15 mm, d=1.5 mm, H=1.6 mm, then β=0.39° and $L_{58} \geq 7.2$ mm.

Figure 9:
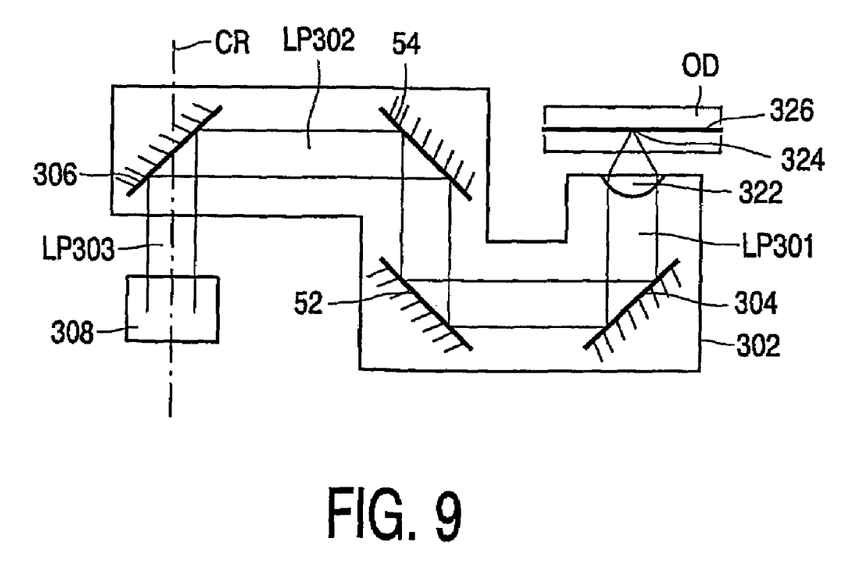
FIG. 9 shows a side cross section of components of an optical scanning device in accordance with an alternative embodiment of the present invention.

FIG. 9 shows a side cross section of components of an optical scanning device in accordance with an alternative embodiment of the present invention.

Features of this embodiment are similar to those of the optical scanning device previously described. Such features are labeled with similar reference numerals incremented by 300 and the descriptions should be taken to apply here also.

In this embodiment the fixed detector arrangement lies on an opposite side of the second light path LP302 to the optical disc OD. In previously described embodiments, the fixed detector arrangement and the optical disc OD lie on the same side of the second light path LP 102, LP 202.

Referring to FIG. 9, the rotary arm 302 further includes a first optical inversion element which is a single reflective surface, in this instance a folding mirror 52. The rotary arm 302 includes also a second optical inversion element which is also a single reflective surface, in this case a folding mirror 54. Both folding mirrors 52, 54 are rigidly fixed to the rotary arm 2 and are separated in a direction parallel the rotation axis CR. In this embodiment the mirrors 52, 54 are stacked in a direction parallel the rotation axis CR. The radiation beam travelling along the second light path LP302 from the first folding mirror 304 is directed to the folding mirror 52 of the optical inversion element, then to the folding mirror 54 of the further optical inversion element and then further on to the second folding mirror 306.

As for the previous embodiment and illustrated using FIGS. 6 and 7, the angular disposition of the second cross section 340 and the angular position of the rotary arm 302 are substantially independent of each other such that the radiation beam spot falling on the detector array 320 is relatively constant. There is, however, a slight variation of an angular disposition of the first cross section 328 with respect to the information layer 326 as previously described. An advantage of this arrangement, compared to a similar arrangement in which the two inverting mirrors 52, 54 are omitted, is that the build height can be reduced.

Figure 10:
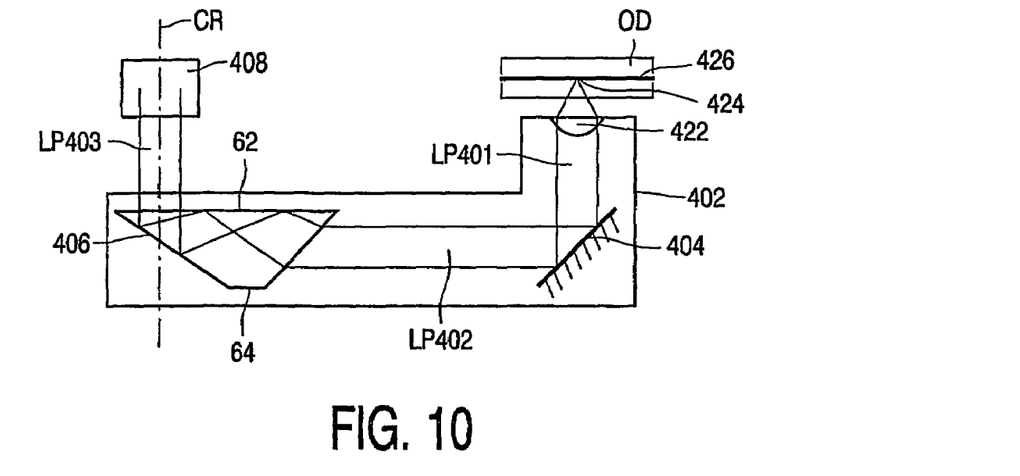
FIG. 10 shows a side cross section of components of an optical scanning device in accordance with an alternative embodiment of the present invention.

FIG. 10 shows a side cross section of components of an optical scanning device in accordance with an alternative embodiment of the present invention. This embodiment allows a reduced number of elements to be used.

Figure 11:
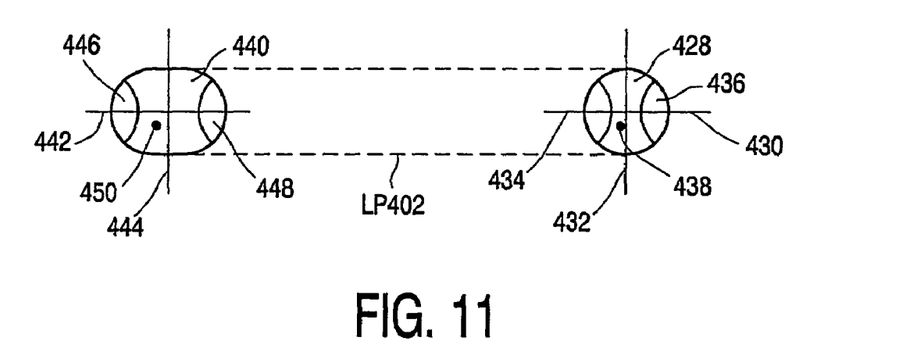
FIGS. 11 and 12 show schematically cross sections of a radiation beam for different angular positions of a rotary arm in accordance with an embodiment of the present invention.
Figure 12:
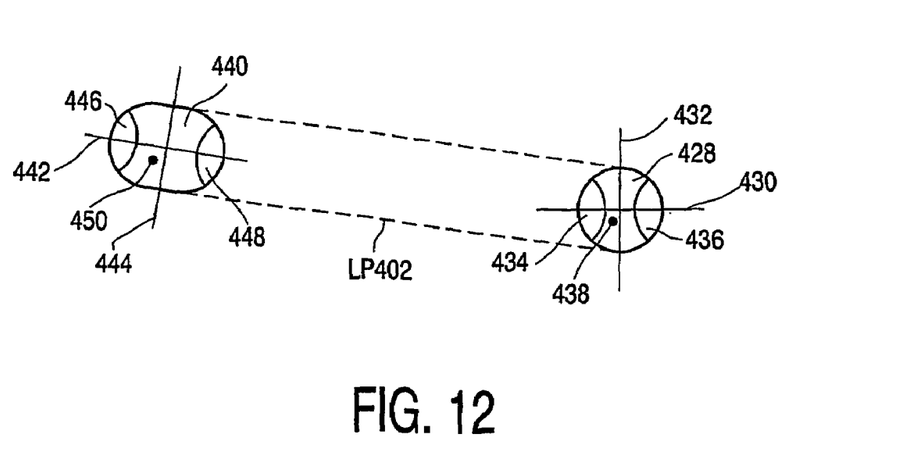

FIGS. 11 and 12 show schematically cross sections of a radiation beam for different angular positions of a rotary arm in accordance with this embodiment of the present invention. Features of this embodiment are similar to those of the optical scanning device previously described. Such features are labeled with similar reference numerals incremented by 400 and the descriptions should be taken to apply here also.

Rigidly fixed to the rotary arm 402 is an optical inversion element which is an asymmetric prism 64. The asymmetric prism 64 includes the second folding mirror 406 and a single reflective surface 62. The radiation beam travelling along the second light path LP 402 from the first folding mirror 404 enters the asymmetric prism 64 and is then reflected by the single reflective surface 62 to the second folding mirror 406.

Referring to FIG. 11, and in a similar manner to previous embodiments of the present invention, the angular disposition of the second cross section 440 is the same as the angular disposition of the first cross section 428, with the rotary arm 402 being in the first angular position. In this embodiment however the second cross section 440 is distorted in the form of a stretch along the first reference axis 442.

Referring now to FIG. 12 in which the rotary arm 402 is in the second angular position, the angular disposition of the second cross section 440 is somewhat dependent on the angular position of the rotary arm 402. The angular disposition about the rotation axis CR of the second cross section 440 is less than the angle 2α. Similarly for when the rotary arm 402 is in the first angular position, the second cross section 440 is distorted in the form of a stretch along the first reference axis 442. On comparison of the position of the off-center reference points 438, 450, of the first and second cross sections respectively, the second cross section 440 is not an inverted version of the first cross section 428.

Figure 13:
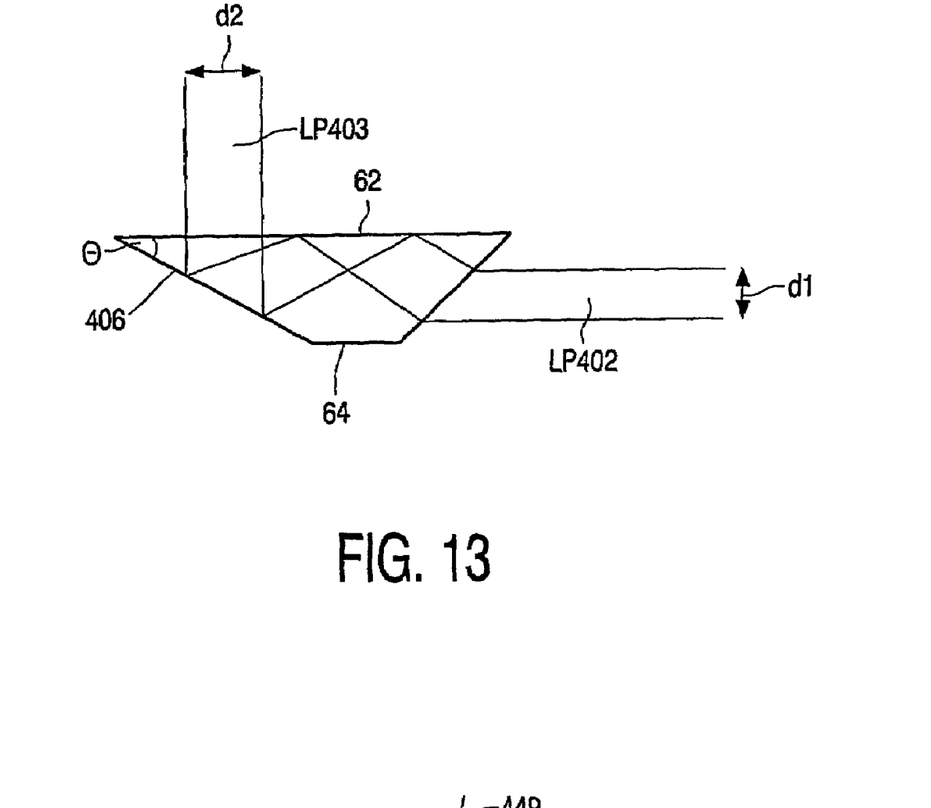
FIGS. 13 and 14 show schematically a distortion of a cross section of a radiation beam in accordance with an embodiment of the present invention.
Figure 14:
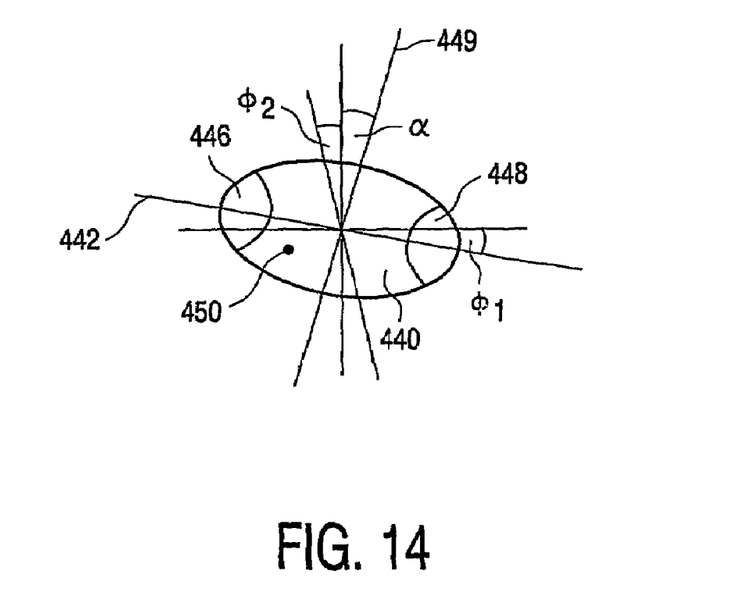

The distortion of the second cross section 440 of the radiation beam is described more specifically using FIGS. 13 and 14. The radiation beam travelling along the second light path LP402 has a first diameter $d_1$ before entering the asymmetric prism 64. Following reflection by the single reflective surface 62 and the second folding mirror 406, the radiation beam now travelling along the light path LP403 has a second diameter d2. The second diameter is equal to a magnification M multiplied by the first diameter $d_1$. This magnification M can be calculated by:

$$M = 1/\tan \theta \quad (6)$$

wherein θ is the angle between the single reflective surface 62 and the second folding mirror 406. This angle θ is dependent on a refractive index of the material from which the asymmetric prism 64 is formed. The angle θ is preferably selected such that the second light path LP402 and the portion of the third light path LP403 between the second and the third folding mirrors 406, 408 lie at an angle of between 80° and 100°, more preferably approximately 90° to each other.

Referring now to FIG. 14, the second cross section 440 has a first distortion angle and a second distortion angle, $\phi_1$, $\phi_2$. The first distortion angle $\phi_1$ corresponds to a displacement from the first reference axis 442 with the rotary arm 402 in the first angular position. The second distortion angle $\phi_2$ corresponds to a displacement from the second reference axis 444 with the rotary arm 402 in the second angular position. The displacement of the rotary arm 402 in the second angular position from the first angular position is indicated by the angle α. Calculation of the first and the second distortion angles, $\phi_1$, $\phi_2$, respectively is as follows:

$$\phi_1 = \alpha - a\tan(\sin \alpha / M \cos \alpha) \quad (7)$$

$$\phi_2 = a\tan(M \sin \alpha / \cos \alpha) - \alpha. \quad (8)$$

Figure 15:
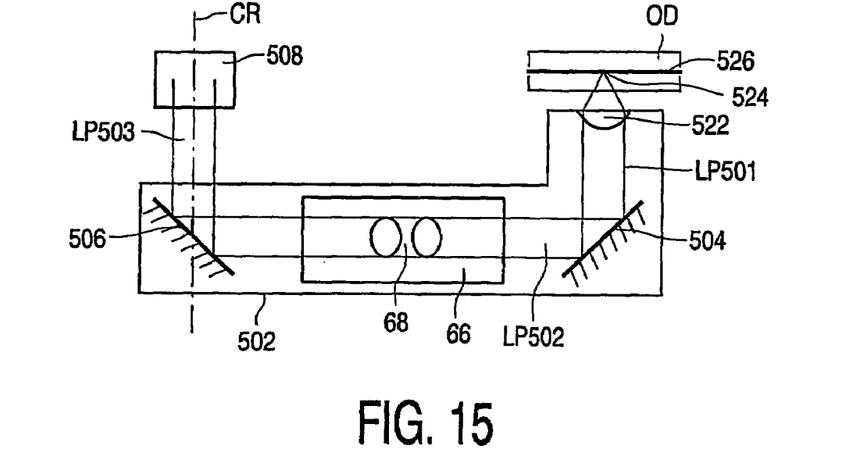
FIG. 15 shows a side cross section of components of an optical scanning device in accordance with an alternative embodiment of the present invention.

FIG. 15 shows a side cross section of components of an optical scanning device in accordance with an alternative embodiment of the present invention.

Figure 16:
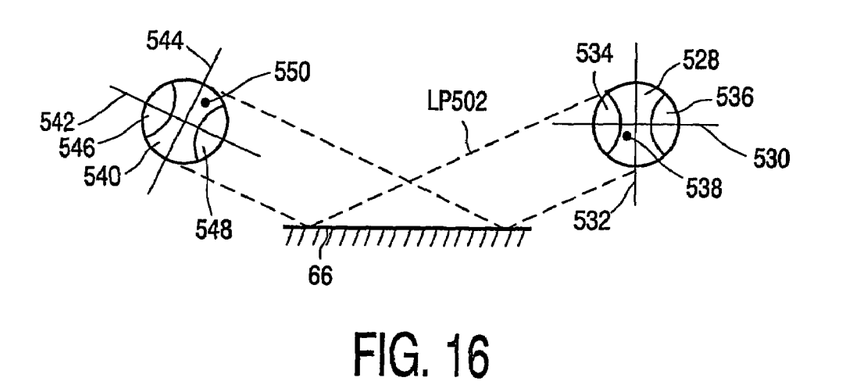
FIGS. 16 and 17 show schematically cross sections of a radiation beam for different angular positions of a rotary arm in accordance with an embodiment of the present invention.
Figure 17:
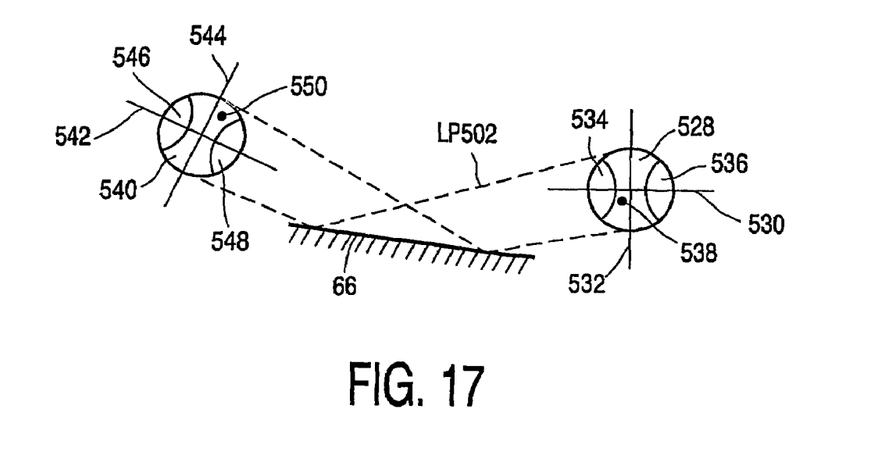

FIGS. 16 and 17 show schematically cross sections of a radiation beam for different angular positions of a rotary arm in accordance with this embodiment of the present invention.

Features of this embodiment are similar to those of the optical scanning device previously described. Such features are labeled with similar reference numerals incremented by 500 and the descriptions should be taken to apply here also.

In this embodiment the optical inversion element comprises a single reflective surface which is a mirror 66, rigidly fixed to the rotary arm 502. The rotation axis CR is arranged vertically and the mirror 66 is also arranged vertically on an inner surface of a wall of the rotary arm 502. The radiation beam travelling along the second light path LP502 from the first folding mirror 504 is reflected by the vertical mirror 66 to the second folding mirror 506. A radiation beam contact spot 68 is illustrated showing the position of reflection of the radiation beam on the mirror 66.

Referring now to FIG. 16 where the rotary arm 502 is in the first angular position, the second cross section 540 has an angular disposition which is different to the first cross section 528. Additionally reflection of the radiation beam by the vertical mirror 66 causes the second cross section 540 to be an inverted version about the first reference axis 542 of the first cross section 528. This is illustrated by comparison of the off-center reference points 538, 550 of the first and second cross sections respectively.

Referring now to FIG. 17 where the rotary arm 502 is in the second angular position, the second cross section 540 again has a different angular disposition to that of the first cross section 528. This angular disposition of the second cross section 540 when the rotary arm 502 is in the second angular position is the same as the angular disposition of the second cross section 540 when the rotary arm 502 is in the first angular position. Additionally, the second cross section 540 is the same inverted version of the first cross section 528.

Therefore, in a similar manner to previous embodiments of the present invention the angular disposition of the second cross section 540 and the angular position of the rotary arm 502 are substantially independent of each other such that the radiation beam spot falling on the detector array 520 is relatively constant.

The above embodiments are understood to be illustrative examples of the invention. Further embodiments of the invention are envisaged.

In embodiments of the present invention the optical inversion element is rigidly fixed to the rotary arm. Alternatively the optical inversion element may be attached to the rotary arm in such a manner that, for example, rotation or translation of the element on the arm can be achieved.

Furthermore it is envisaged that the optical inversion element is not limited to being positioned on the rotary arm along the second light path. Alternatively the element may be located along the third light path.

In the above embodiments the described radial tracking system is of a one-spot push-pull type. It is envisaged further that of a three-spot push-pull type may alternatively be used.

In the above embodiments mirrors and prisms are used as optical inversion elements. Other types of element may alternatively be used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning an information layer of an optical record carrier, the device including:
   a rotary arm (2; 102; 202; 302; 402; 502) which is arranged to swing about a rotation axis (CR) to alter an angular position of the rotary arm about the rotation axis;
   a detector arrangement (10) arranged separate from the rotary arm (2; 102; 202; 302; 402; 502) for detecting a radiation beam spot, the radiation beam spot (40; 140; 240; 340; 440; 540) having an angular disposition;
   a first reflective surface (4; 104; 204; 304; 404; 504) attached to the rotary arm (2; 102; 202; 302; 402; 502);
   a second reflective surface (6; 106; 206; 306; 406; 506) attached to the rotary arm (2; 102; 302; 402; 502);
   a first light path (LP1; LP101; LP201; LP301; LP401; LP501) running from a location on the record carrier to said first reflective surface;
   a second light path (LP2; LP202; LP302; LP402; LP502) running from said first reflective surface to said second reflective surface;
   a third light path (LP3; LP103; LP203; LP303; LP403; LP503) running from said second reflective surface to said detector arrangement (10), characterized in that said rotary arm includes at least one optical inversion element (52; 54; 56; 58; 64; 66) arranged such that a dependence between variation of the angular position of the rotary arm and variation of the angular disposition of the radiation beam spot is reduced.

2. An optical scanning device according to claim 1, wherein the angular disposition of the radiation beam spot and the angular position of the rotary arm (2; 102; 202; 302; 402; 502) are substantially independent, after taking into account a variation caused by a change in the direction of data tracks on the optical record carrier across the swing path of the rotary arm.

3. An optical scanning device according to any of claims 1, wherein said radiation beam spot comprises regions (46; 48; 146; 148; 446; 448; 546; 548) corresponding to first diffraction orders of said radiation beam for use in a radial tracking function.

4. An optical scanning device according to claim 1, wherein a portion of the third light path (LP3; LP103; LP203; LP303; LP403; LP503) is substantially coincident with the rotation axis (CR).

5. An optical scanning device according to claim 1, wherein the optical inversion element is rigidly fixed to the rotary arm.

6. An optical scanning device according to claim 1, wherein the optical inversion element includes only a single reflective surface (52).

7. An optical scanning device according claim 1, wherein the optical scanning device comprises a further optical inversion element (54), wherein the optical inversion element and said further optical inversion element are separated in a direction parallel to the rotation axis (CR).

8. An optical scanning device according to claim 1, wherein the optical inversion element comprises a prism.

9. An optical scanning device according to claim 8, wherein the prism includes the second reflective surface (406).

10. An optical scanning device according to claim 9, wherein the prism is an asymmetric prism.

11. An optical scanning device according to claim 1, wherein the optical inversion element comprises a mirror (52; 56; 58; 66).

* * * * *